United States Patent Office 2,883,387
Patented Apr. 21, 1959

2,883,387
6-ALKOXY-TROPINONE DERIVATIVES

Arthur Stoll, Arlesheim, Ernst Jucker, Binningen, and Adolf Lindenmann, Basel, Switzerland, assignors, by mesne assignments, to Saul & Co., Newark, N.J., as nominee of Fidelity Union Trust Company, executive trustee under Sandoz Trust No Drawing. Application June 21, 1954
Serial No. 438,334

Claims priority, application Switzerland June 24, 1953

16 Claims. (Cl. 260—292)

The present invention is concerned with 6-alkoxy-tropinones. More particularly, the invention has especial relation to the 6-alkoxy-tropinones which correspond to the formula

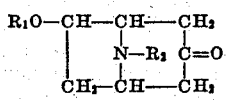

wherein $R_1$ stands for a lower alkyl group, while $R_2$ stands for any one of a wide variety of aliphatic or alkyl-aromatic groups, as will hereinafter appear in greater detail.

The 6-alkoxy-tropinones of the present invention are prepared, according to the invention, by condensing an O-alkyl-malic dialdehyde with acetone dicarboxylic acid and an aliphatic or alkylaromatic primary amine, after the manner of the following reaction scheme:

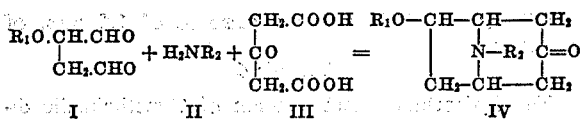

In the foregoing formulae, $R_1$ stands for —$CH_3$, —$C_2H_5$, —$C_3H_7$-n or —$C_3H_7$-iso, and $R_2$ may stand for example for —$CH_3$, —$C_2H_5$, —$C_3H_7$-n, —$C_3H_7$-iso, —$C_4H_9$, —$CH_2CH_2OH$,

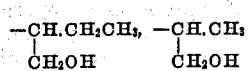

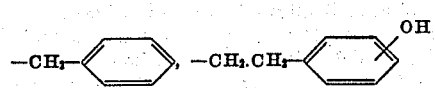

etc. and many other aliphatic or araliphatic groups.

The condensation is advantageously carried out under physiological conditions, i.e. in a dilute aqueous solution at room temperature (about 15 to about 30° C.) and at a pH of 3 to 11.

The procedure may for instance be along the following lines:

Acetone dicarboxylic acid and the primary amine are dissolved in water, whereupon the theoretical quantity of freshly-prepared O-alkyl-malic dialdehyde (e.g. in the form of a hydrochloric acid solution thereof obtained from the corresponding 2,3,5-trimethoxy-tetrahydrofurane by heating a 0.1-normal aqueous hydrochloric acid solution of the latter) is added. The reaction mixture is buffered if necessary, for example by the addition of sodium acetate, and is then allowed to stand at room temperature for several, e.g. three, days. The reaction proceeds with a considerable evolution of carbon dioxide, the ceasing of which indicates the end of the condensation. The reaction solution is rendered alkaline, e.g. with potassium carbonate, and is then extracted with a water-immiscible organic solvent, such as chloroform and the like. The extract is evaporated to dryness, after being dried over a dehydrating agent, and the final 6-alkoxy-tropinone is obtained by fractionally distilling the residue under a high vacuum.

The compounds of the invention are characterized by their various utilities. The pharmacodynamically active substituents on the molecules thereof result in a manifold action on the animal organism. For certain lower animal organisms, however, they are highly toxic, and this characteristic makes them useful for instance as insecticides. They may also be used as rodenticides, e.g. against ordinary household mice. In view of their optical activity, they are particularly useful for separating optically active organic acids into their antipodes, since they readily form enantiomorphic salts with such compounds, which salts can be separated by fractional crystallization. The compounds also form salts with inorganic acids; e.g. the hydrohalide salts (hydrochloride, etc.) and the like. Finally, they constitute valuable intermediates for the preparation of pharmacologically active compounds. Thus, for example, by reducing the keto group (i.e. the 3-one group) to the secondary alcohol group and esterifying the resultant 6-alkoxy-tropan-3-ol derivative with e.g. benzoic acid, an ester-like product having scopolamine-like activity is obtained.

The O-alkyl-malic dialdehydes of Formula I, supra, are advantageously prepared by hydrolyzing the corresponding 2,3,5-trialkoxy-tetrahydrofuranes, e.g. with the aid of 0.1-normal aqueous hydrochloric acid or sulfuric acid, heating the mixture of reactants for a short time on the water-bath. The 2,3,5-trialkoxy-tetrahydrofuranes themselves can be prepared in a variety of ways. Thus, they may be prepared by dissolving furane in an alcohol of the formula $R_1OH$, wherein $R_1O$— corresponds to the alkoxy groups of the trialkoxy compound, and then treating the resultant solution with chlorine or bromine in the absence of any agent which binds hydrogen halide, according to the reaction scheme:

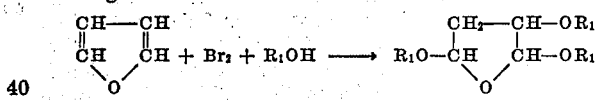

The following examples set forth presently-preferred representative embodiments of the invention, and these are intended to be entirely illustrative and not at all limitative in character. Parts are by weight unless otherwise indicated; parts by weight bear the same relation to parts by volume as do grams to milliliters. Temperatures are in degrees centigrade.

Example 1

The hydrochloric acid solution of O-methyl-malic dialdehyde (prepared by the hydrolysis of 40.5 parts by weight of 2,3,5-trimethoxy-tetrahydrofurane) is added to a solution of 73 parts of acetone dicarboxylic acid, 34 parts of methylamine hydrochloride and 170 parts of sodium acetate in 5000 parts by volume of water, and the pH is adjusted to 4.0 by means of concentrated hydrochloric acid. $CO_2$-evolution begins after about one hour. The reaction mixture is allowed to stand for 3 days at 20–25°, the pH rising to 4.7. The red-brown reaction solution is rendered alkaline by the addition of potassium carbonate, is saturated with sodium chloride, and then extracted for 20 hours with chloroform. After drying the chloroform extract with sodium sulfate and distilling off the extraction agent, the residue is distilled in a high vacuum. The thus-produced 6-methoxy-tropinone, which corresponds to the formula

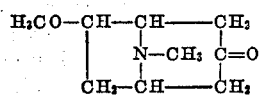

distills between 85–100° under a pressure of 0.005 mm. of mercury, as a yellow oil. With hydrochloric acid, it forms the 6-methoxy-tropinone-hydrochloride salt, which melts at 195–196°.

Example 2

The hydrochloric acid solution of O-ethyl-malic dialdehyde (prepared by the hydrolysis of 51 parts of 2,3,5-triethoxy-tetrahydrofurane) is added to a solution of 73 parts of acetone dicarboxylic acid, 34 parts of methylamine chloride and 170 parts of sodium acetate in 5000 parts by volume of water, and the pH adjusted to 4.0 by the addition of concentrated hydrochloric acid. $CO_2$-evolution begins after about one hour. The reaction mixture is allowed to stand for 3 days at 20–25°, the pH rising to 4.7. The red-brown reaction solution is rendered alkaline by the addition of potassium carbonate, is saturated with sodium chloride, and then extracted for 20 hours with chloroform. After drying the chloroform extract with sodium sulfate and distilling off the extraction agent, the residue is distilled in a high vacuum. The thus-produced 6-ethoxy-tropinone, which corresponds to the formula

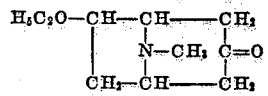

distills at a pressure of 0.005 mm. of mercury between 83–93°, as a yellow oil. By the action of hydrochloric acid, the base is converted into the corresponding 6-ethoxy-tropinone hydrochloride salt which melts at 171–172° (uncorrected).

Example 3

The hydrochloric acid solution of O-isopropylmalic dialdehyde (prepared from 12.7 parts of 2,3,5-triisopropoxytetrahydrofurane by hydrolysis, e.g. by heating for 45 minutes to 70–75° in 200 parts by volume of 0.1-normal aqueous hydrochloric acid) is added to a solution of 14.6 parts of acetone dicarboxylic acid, 6.7 parts of methylamine hydrochloride and 34 grams of sodium acetate in 1000 parts by volume of water, and the pH is adjusted to 4.0 by means of concentrated hydrochloric acid. The reaction mixture is allowed to stand for 3 days at 20–25°, whereupon the pH rises to 4.5 and the $CO_2$-evolution which has taken place, ceases. The reaction solution is thereupon rendered alkaline by the addition of potassium carbonate, saturated with sodium chloride, and extracted with 1000 parts by volume of chloroform. After drying the chloroform extract over sodium sulfate, and distilling off the chloroform, the residue is distilled under a high vacuum. The thus-produced 6-isopropoxy-tropinone (6-isopropoxy-tropan-3-one), which corresponds to the formula

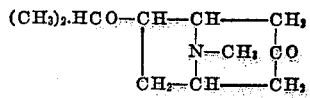

passes over as a yellow oil between 68 and 78° under a pressure of 0.05 mm. of mercury.

Example 4

40.5 parts of 2,3,5-trimethoxy-tetrahydrofurane are heated to 70–75° for 30 minutes in 1000 parts by volume of 0.1-normal aqueous hydrochloric acid. The resultant hydrochloric acid solution of O-methyl-malic dialdehyde is added to a solution of 73 parts of acetone dicarboxylic acid, 37 parts of n-butylamine and 170 parts of sodium acetate in 5000 parts by volume of water, and the pH is then adjusted to 4.0 by means of hydrochloric acid. The solution is allowed to stand for 3 days at 20–25°. At the end of this time, the ensuing $CO_2$-evolution has ceased and the pH of the solution has risen to 4.7–4.8. Thereupon the reaction solution is rendered alkaline by the addition of potassium carbonate, then saturated with sodium chloride, and finally extracted with a total of 3000 parts by volume of chloroform. After drying the extract over sodium sulfate, the chloroform is evaporated off, and the residue is distilled under reduced pressure. The thus-produced N-n-butyl-6-methoxy-nortropinone, which corresponds to the formula

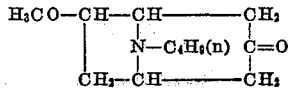

distills at 104–115° at a pressure of 1 mm. of mercury. It forms the corresponding N-n-butyl-6-methoxy-nortropinone hydrochloride which, recrystallized from methanol ether, melts at 170–171°.

Example 5

408 parts of 2,3,5-triethoxy-tetrahydrofurane are heated for 30 minutes to 70–75° in 8000 parts by volume of 0.1-normal aqueous hydrochloric acid. The resultant hydrochloric acid solution of O-ethyl-malic dialdehyde is added to a solution of 580 parts of acetone dicarboxylic acid, 146 parts of n-butylamine and 1300 parts of sodium acetate in 4000 parts by volume of water and the pH then adjusted to 4.4 with the aid of hydrochloric acid. The resultant solution is allowed to stand for 3 days at 20–25°. At the end of this time, $CO_2$-evolution will have ceased and the pH of the solution will have risen to about 4.8. The reaction solution is thereupon rendered alkaline with potassium carbonate, saturated with sodium chloride, and then extracted with a total of 10,000 parts by volume of chloroform. The chloroform extract is dried over sodium sulfate, the chloroform then evaporated off, and the residue distilled under reduced pressure. The so-obtained N-n-butyl-6-ethoxy-nortropinone, which corresponds to the formula

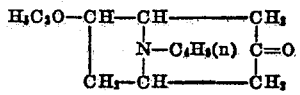

distills at 108–114° under a pressure of 1.5 mm. of mercury.

Example 6

The hydrochloric acid solution of O-methylmalic dialdehyde (prepared by warming 8 parts of 2,3,5-trimethoxy-tetrahydrofurane to 70–75° for 30 minutes in 200 parts by volume of 0.1-normal hydrochloric acid) is added to a solution of 14.6 parts of acetone dicarboxylic acid, 9.5 parts of n-propylamine hydrochloride and 34 parts of sodium acetate, and the pH then adjusted to 4.0 with the aid of concentrated hydrochloric acid. The reaction solution is allowed to stand at 20–25° for 3 days, whereupon the pH will have risen to 4.5 and the $CO_2$-evolution, which takes place, will have ceased. The reaction solution is then rendered alkaline with potassium carbonate, salted out with sodium chloride, and extracted with a total of 3000 parts by volume of chloroform. After drying the chloroform extract over sodium sulfate and distilling off the extraction agent, the residue is distilled under a high vacuum. The so-prepared N-n-propyl-6-methoxy-nortropinone, which corresponds to the formula

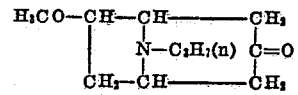

distills at 105–115° under a pressure of 1.5 mm. of mercury, as a yellowish oil.

Example 7

The sulfuric acid solution of O-methyl-malic dialdehyde, obtained by heating 50 parts of 2,3,5-trimethoxy-tetrahydrofurane with 0.8 parts by volume of concentrated sulfuric acid in 330 parts by volume of water on the water bath for 2 hours, is added to a solution of 131.5 parts of acetone dicarboxylic acid, 35.2 parts of 2-amino-butanol(1) and 197 parts of sodium acetate in 5000 parts by volume of water, and the pH of the mixture then adjusted to 4.5 by the addition of aqueous caustic soda solution. At the end of 2 days, carbon dioxide evolution has ceased and the pH of the solution is 4.8. The solution is rendered alkaline with $K_2CO_3$, saturated with sodium chloride and extracted with a total of 5000 parts by volume of chloroform. Chloroform extract is dried over sodium sulfate, the sulfate evaporated off, and the residue distilled under a high vacuum. N-hydroxybutyl-6-methoxy-nortropinone which corresponds to the formula

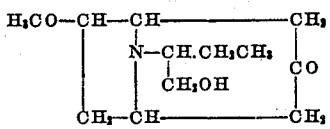

goes over as a yellow-orange oil between 145 and 154° under a pressure of 0.004 mm. of mercury.

*Example 8*

The sulfuric acid solution of O-methyl-malic dialdehyde, obtained by heating 50 parts of 2,3,5-trimethoxy-tetrahydrofurane with 0.8 part by volume of concentrated sulfuric acid in 330 parts by volume of water on the water bath for 2 hours, is added to a solution of 131.5 parts of acetone dicarboxylic acid, 17.8 parts of ethylamine and 197 parts of sodium acetate in 5000 parts by volume of water and the pH of the mixture is adjusted to 4.4 by the addition of aqueous caustic soda solution. After standing for 2 days, the $CO_2$-evolution, which ensues, ceases, and the pH of the solution will have risen to 7. The solution is then rendered alkaline with aqueous caustic solution, saturated with sodium chloride, and extracted with a total of 5000 parts by volume of chloroform. The chloroform extract is dried over sodium sulfate, the solvent is evaporated off, and the residue is distilled in a high vacuum. The so-obtained N-ethyl-6-methoxy-nortropinone, which corresponds to the formula

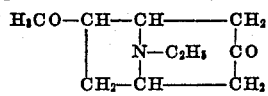

passes over as a yellow oil between 75–82° under a pressure of 0.005 mm. of mercury.

*Example 9*

The sulfuric acid solution of O-methyl-malic dialdehyde, obtained by heating 50 parts of 2,3,5-trimethoxy-tetrahydrofurane with 0.8 part by volume of concentrated sulfuric acid in 330 parts by volume of water on the water-bath for two hours, is added to a solution of 131.5 parts of acetone dicarboxylic acid, 24.0 parts of ethanolamine and 190 parts of sodium acetate in 5000 parts by volume of water, and the pH of the mixture adjusted to 4.4 by the addition of aqueous caustic soda solution. After the mixture has stood for two days, no more $CO_2$ is evolved, and the pH of the solution has risen to 4.7. The solution is rendered alkaline by means of caustic soda, then saturated with sodium chloride, and finally extracted with a total of 5000 parts by volume of chloroform. The chloroform extract is dried over sodium sulfate, the solvent is evaporated, and the residue is distilled under a high vacuum. N-hydroxyethyl-6-methoxy-nortropinone, which corresponds to the formula

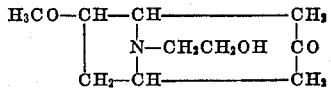

goes over as a yellow oil between 145 and 150° at a pressure of 0.002 mm. of mercury.

*Example 10*

The sulfuric acid solution of O-methyl-malic dialdehyde, obtained by heating 162 parts of 2,3,5-trimethoxy-tetrahydrofurane with 2.5 parts by volume of concentrated sulfuric acid in 1000 parts by volume of water on the water-bath for two hours, is added to a solution of 293 parts of acetone dicarboxylic acid, 107 parts of benzylamine and 680 parts of sodium acetate in 15,000 parts by volume of water, and the pH of the mixture adjusted to 4.4. After standing for three days at room temperature, the evolution of $CO_2$ which takes place has ceased and the pH of the solution has risen to 4.7–4.8. The solution is rendered alkaline with caustic soda, saturated with sodium chloride, and extracted with a total of 15,000 parts by volume of chloroform. The chloroform extract is dried over sodium sulfate, the solvent is evaporated off, and the residue is distilled under a high vacuum. N-benzyl-6-methoxy-nortropinone goes over at 143–150° at a pressure of 0.001–0.002 mm. of mercury.

*Example 11*

The sulfuric acid solution of O-ethyl-malic dialdehyde, obtained by heating 51 parts of 2,3,5-triethoxytetrahydrofurane with 0.8 part by volume of concentrated sulfuric acid in 300 parts by volume of water on the water-bath for two hours, is added to a solution of 73 parts of acetone dicarboxylic acid, 27 parts of benzylamine and 170 parts of sodium acetate in 4200 parts by volume of water, and the pH of the mixture is adjusted to 4.4. After standing for 3 days at room temperature, there is no further evolution of carbon dioxide and the pH of the solution has risen to 4.7–4.8. The solution is rendered alkaline with caustic soda, saturated with sodium chloride, and then extracted with a total of 5000 parts by volume of chloroform. The chloroform extract is dried over sodium sulfate, the solvent evaporated off, and the residue distilled under a high vacuum. N-benzyl-6-ethoxy-nortropinone, which corresponds to the formula

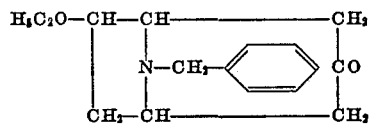

passes over at 126–130° under a pressure of 0.002 mm. of mercury.

Having thus disclosed the invention, what is claimed is:

1. A member selected from the group consisting of compounds of the formula

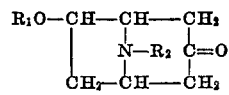

and the hydrochlorides thereof, wherein $R_1$ is a lower alkyl group with 1 to 3 carbon atoms, and $R_2$ is a member selected from the group consisting of lower alkyl, ω-hydroxy (lower) alkyl and benzyl.

2. A compound of the formula

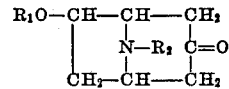

wherein $R_1$ is a lower alkyl group with 1 to 3 carbon atoms, and $R_2$ is lower alkyl.

3. A compound of the formula

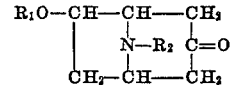

wherein $R_1$ is a lower alkyl group with 1 to 3 carbon atoms, and $R_2$ is ω-hydroxy (lower) alkyl.

4. A compound of the formula

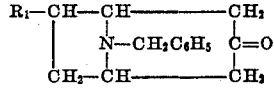

wherein $R_1$ is a lower alkyl group with 1 to 3 carbon atoms.

5. 6-methoxy-tropinone.
6. 6-ethoxy-tropinone.
7. 6-isopropoxy-tropinone.

8. N-n-butyl-6-methoxy-nortropinone.
9. N-n-butyl-6-ethoxy-nortropinone.
10. N-n-propyl-6-methoxy-nortropinone.
11. N-(1'-hydroxy-butyl-2')-6-methoxy-nortropinone.
12. N-ethyl-6-methoxy-nortropinone.
13. N-(1'-hydroxy-ethyl-2')-6-methoxy-nortropinone.
14. N-benzyl-6-ethoxy-nortropinone.
15. N-benzyl-6-methoxy-nortropinone.
16. 6-lower alkoxy tropinone.

References Cited in the file of this patent
Stoll et al.: Helv. Chim. Acta 35: 1263–69 (1952).
Schoepf et al.: Annalen 558: 109–124 (1947).

UNITED STATES PATENT OFFICE
Certificate of Correction

Patent No. 2,883,387 April 21, 1959

Arthur Stoll et al.

It is hereby certified that error appears in the printed specification of the above numbered patent requiring correction and that the said Letters Patent should read as corrected below.

Column 6, lines 66 to 70, claim 1, the formula should read as shown below instead of as in the patent:

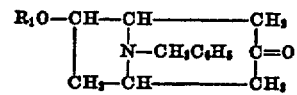

Signed and sealed this 10th day of November 1959.

[SEAL]

Attest:
KARL H. AXLINE,
*Attesting Officer.*

ROBERT C. WATSON,
*Commissioner of Patents.*